G. S. MAXWELL.
DISTANCE AND SPEED INDICATOR AND RECORDER.
APPLICATION FILED SEPT. 17, 1908.

949,000.

Patented Feb. 15, 1910.
4 SHEETS—SHEET 1.

UNITED STATES PATENT OFFICE.

GEORGE S. MAXWELL, OF WASHINGTON, DISTRICT OF COLUMBIA.

DISTANCE AND SPEED INDICATOR AND RECORDER.

949,000.　　　　　Specification of Letters Patent.　　Patented Feb. 15, 1910.

Application filed September 17, 1908. Serial No. 453,537.

*To all whom it may concern:*

Be it known that I, GEORGE S. MAXWELL, citizen of the United States, residing at Washington, in the District of Columbia, have invented certain new and useful Improvements in Distance and Speed Indicators and Recorders; and I do hereby declare the following to be a full, clear, and exact description of the invention, such as will enable others skilled in the art to which it appertains to make and use the same.

This invention relates to distance and speed indicators and recorders, and has for its object the provision of a device, complete, yet simple and compact, one which shall be accurate in its results, which shall operate continuously without requiring attention, and which is safeguarded against interference from without.

The device is particularly adapted for use in connection with public vehicles, where it is important that an accurate record be made of the use to which the vehicle is put during a continuous period, and that the continuity of such record shall not be interrupted by reason of failure to rewind the recording mechanism at necessary intervals, nor its faithfulness destroyed by being tampered with.

The invention as hereinafter particularly set out in the claims, will now be fully described in connection with the accompanying illustrative drawings, in which—

Describing the device by reference to the drawings, the mechanism as a whole is contained within a case 1 suitably supported on the vehicle, power being transmitted from the vehicle wheel by means of a flexible shaft 2 or the like to a drive shaft 3 journaled in a bearing 4 and running upon balls 5. Near its upper extremity the shaft 3 carries a worm 6 in engagement with a worm-wheel 7 fixed on the transmission shaft 8. This shaft 8 carries at its opposite end a worm 9 meshing with a gear 10 on the shaft 11, the latter having at its other end a bevel gear 12 in engagement with a larger bevel gear 13, having affixed thereto a cam 14. The gearing between the cam 14 and the vehicle wheel is so proportioned that the cam 14 will make one revolution for each mile traveled.

An angle lever 15 pivoted at 16 carries on one arm a roll 17 bearing on the cam 14 and on its other arm a roll 18 traveling in an annular groove or raceway 19 formed in a knob 20 adjustably secured by a screw 21 on the post 22. This post is slidably mounted in a guide 23 and has affixed to its upper end a pencil arm 24 provided with a pencil 25 in operative relation to the recorder tape 26. By the adjustment of the knob 20 on the post 22, the pencil may be brought into proper lateral relation to the recorder tape. The tape 26 is fed from the supply case 27 over the face of the feed roll 28 to the take-up roll 29, which latter is carried by an arm 30 of a shaft 31 provided with a projecting pin 32. A spring 33 secured to the pin 32 and to the case at 34 holds the take-up roll yieldingly toward the feed roll 28. The axle of the take-up roll 29 is slitted at 35 to receive and clamp the end of the tape 26, and its end plate 36 is so located as to overlap the end plate 37 of the feed roll 28 so that the tape wound on the axle of the take-up roll is always yieldingly pressed between said roll and the surface of the feed roll, which is of a friction material such as rubber or the like. The feed roll is positively driven from the minute hand arbor of clock mechanism 38, whereby the tape is fed across its surface by friction contact therewith and wound onto the take-up roll also by friction.

Figure 5:
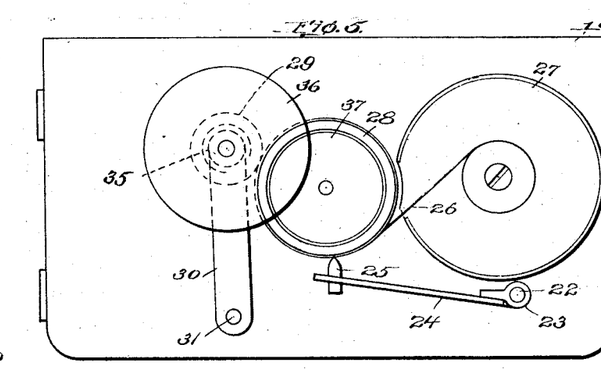
Fig. 5 is a detail of the recorder tape rolls.

Preferably the axle of the take-up roll 29 is formed as a permanent magnet and its end plate 36 of soft iron, the end plate 37 of the feed roll being also of soft iron. The end plates of the two rolls are therefore magnetically drawn together and the take-up roll is frictionally driven by the feed roll independent of the tape.

The feed roll 28, being driven from the minute hand arbor of the clock mechanism, is rotated once in each hour, and as the tape 26 has on its face transverse lines 39 so spaced at regular intervals that twelve of such lines shall correspond to the circumference of the feed roll 28, whereby twelve of said lines will pass beneath the pencil 25 each hour, the space bounded by two of the lines corresponding to five minutes of time. These spaces may also be subdivided each into five spaces of one minute each. As now the cam 14 revolves once for each mile traveled, the pencil 25 will, under the influence of the lever 15, move up and down transversely of the tape 26 one round trip for each mile, this movement being in a right line, and as the tape moves forward beneath the pencil one space during a given period of time, the pencil record on the tape will show the distance traveled and the rate per mile. To illustrate, if the record shows a line up and down within a five-minute space, the vehicle must have, during that time, traveled one mile or at the rate of twelve miles per hour, if there is recorded two up and down movements, the distance traveled was two miles in the five minutes.

The speed indicating mechanism consists of the following parts: The inner end of the drive shaft 3, heretofore described, is slotted at 40 to receive the flat end 41 of the governor rod 42, supported by standards 43 and 44. The latter provided with adjusting screw 45, a ring governor 46 is secured to the shaft 42 by a transverse pin 46ᵃ so as to swing easily, and is held at a sharp inclination to the shaft by a spring 47 passing around the pin and bearing against the shaft and ring respectively. A disk slide 48 is secured to the shaft 42 by a pin 49, so as to permit of axial movement and is pressed away from the governor ring by a helical compression spring 50 abutting against said disk and its pin 49. This disk and the ring are connected at one side by a link 51.

Figures 3, 8:
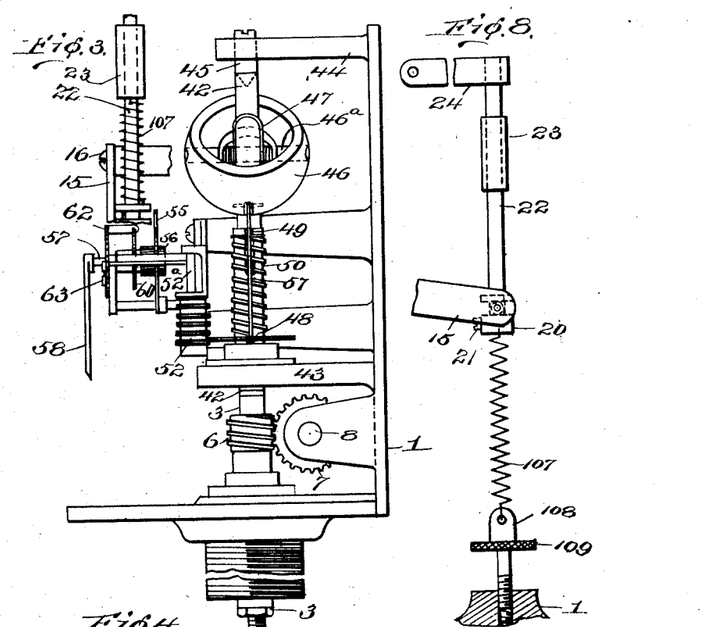
Fig. 3 is a partial side view of the governor mechanism.
Fig. 8 is a detail of the pencil adjusting mechanism.
Figure 4:
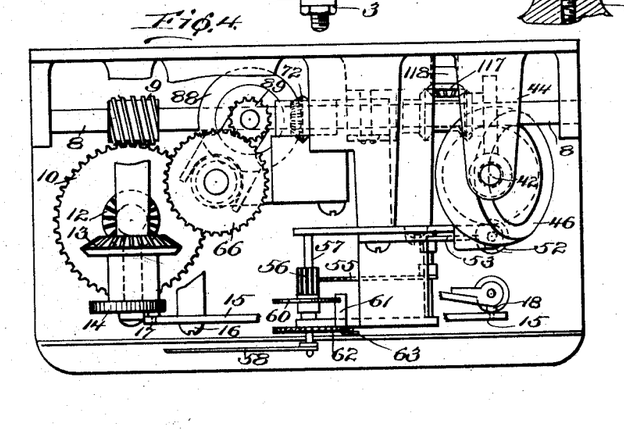
Fig. 4 is a view from above with the cover removed.

As will be readily understood, when at rest the parts will occupy the position shown in Fig. 3, and as the speed of the drive shaft increases, centrifugal force acting against the spring 47 will cause the ring to seek a position more nearly at right angles to the shaft 38, thereby drawing the disk 48 against its spring 50, the position of the ring and disk depending on the speed.

Slidably and rotatably mounted alongside the governor shaft 42 on a rod 52ᵃ, is a transversely ribbed sleeve 52 forming a circular rack, with one notch of which the disk 48 engages, sliding said rack as the governor shifts the disk. The rack is also in mesh with a toothed segment 53 pivoted at 54, which segment may be formed integral with or as shown in fixed relation to another toothed segment 55, which in turn meshes with a pinion 56 on the arbor 57 of the index hand 58, whereby any shifting of the rack 52 by the governor 46 will cause the index pointer to travel over the dial 59, indicating the speed of travel at the moment.

The rack 52, being formed with its teeth as circles, may rotate freely on the rod 52ᵃ and thus avoid any binding due to friction between itself and the rapidly rotating disk 48, while maintaining its engagement with the segment 53.

To finely adjust the action of the governor, a spring 60 is coiled about the index arbor 57 with one end secured thereto and the other to a stud 61 on the rear face of a plate 62, which latter may have milled edges to facilitate its rotation; a lock screw 63 holding it in adjusted position.

In a recorder, it sometimes happens that the winding of the clock mechanism is forgotten and the instrument stops, thus interrupting the record. To provide against such happening, means are provided to automatically rewind the clock when necessary as follows: The winding mandrel 64 of the clock mechanism is held in a squared opening in the end of a spindle 65. Mounted loosely on this spindle is a gear wheel 66 with pins 67 projecting therefrom forming clutch members coöperating with corresponding pins 68 projecting from a sleeve 69 splined to the spindle 65. A worm 70 is also secured to the spindle by a pin 71 and rotates therewith. On the shaft 8, heretofore referred to, a bevel gear 72 rotates freely, being held against longitudinal shifting by a set screw 73, and this gear is provided with pins 74 forming clutch members coöperating with similar pins 75 carried by a sleeve 76, splined to said shaft.

The sleeves 69 and 76 have peripheral recesses or raceways 77 and 78, in the former of which travels the end of a lever 79 pivoted at 80 and in the latter the arm 81 of a bell-crank lever pivoted at 82 and having its other arm 83 bifurcated to form two prongs 84 and 85. A link 86 connects the two levers as shown clearly in Fig. 6. A winding shaft 87 carries at its lower end a bevel gear 88 meshing with the gear 72 and at its upper end a pinion 89 in mesh with the gear wheel 66, while freely sliding on the winding shaft 87 is a sleeve 90 having a rack meshing with the worm 70, this sleeve 90 carrying an adjustable disk 91 which extends between the prongs 84 and 85 of the lever arm 83.

Figure 6:
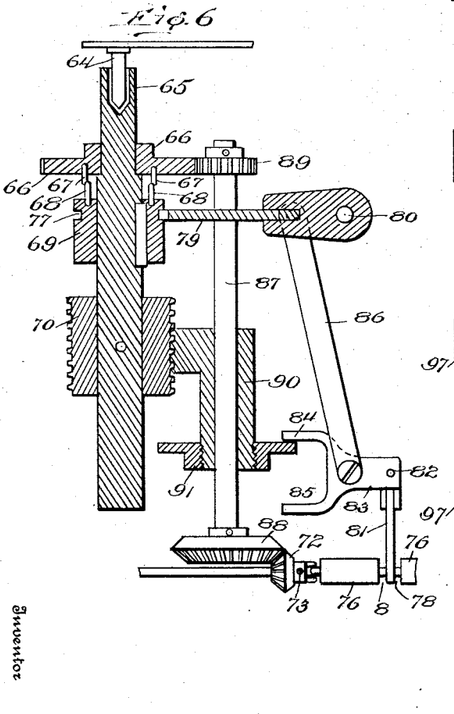
Fig. 6 is a sectional detail of the rewinding mechanism.

Normally the winding mandrel 64, as the clock runs down, slowly rotates the spindle 65 and worm 70 causing the sleeve 90 to rise until as the clock reaches a stage needing winding the disk 91 touches the prong 84, shifting the bell crank lever and moving the sleeve 76 to the left and at the same time the link 86 shifts the lever 79 and moves the sleeve 69 upward, thereby coupling the two sets of clutch members and bringing the winding shaft 87 into operative relation to the shafts 8 and 65, whereupon the drive shaft 3, through the shafts 8 and 87 and spindle 65, causes the rewinding of the clock through its mandrel 63, during which operation the worm 70 in its reverse movement causes the sleeve 90 to rapidly descend until as the winding is finished the disk 91 touches the prong 85 again shifting the levers and uncoupling the two clutches, thus disconnecting the winding shaft from the transmission shaft.

Figure 7:
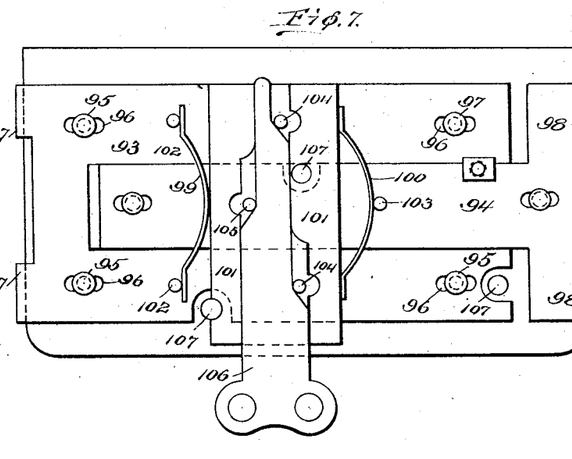
Fig. 7 is a detail of the lock.

The recorder case is preferably made in two parts 1 and 1ª, carrying the index dial 59 and a window for visual inspection of the record, and recesses 92. Within the case in this plane are arranged two locking plates 93 and 94, the one being U-shaped and the other T-shaped, thus complementing each other and together dividing the interior of the case into two compartments. The relation of the locking plates will be clearly seen from Fig. 7. The plates have a limited endwise movement upon the pins 95 passing through the slots 96 and are yieldingly pressed outward with their projections 97 and 98 into the recesses 92 by bow springs 99 and 100 abutting on the one side against the stationary bridge plate 101 and on the other against pins 102 and 103 carried by the lock plates. Other pins 104 carried by the lock plate 93 and 105 carried by the lock plate 94 are arranged to be engaged by the beveled edges of the key 106 thus forcing the two lock plates inward against the springs 99 and 100 so as to clear the recesses 92 and permit the cover 1ª of the case to be removed by one having the proper key and not otherwise. Properly placed apertures 107 provide for the arbors of the clock mechanism connecting with the recording mechanism.

In order to yieldingly press the pencil 25 against the tape 26 and also to avoid any lost motion in its transverse travel, I preferably secure a coiled tension spring 107 to the knob 20 and about the pencil post 22 with its other end abutting against the guide 23 as shown in Fig. 3, or secured to a binding post 108 at the bottom of the case, as shown in Fig. 8, so as to force the knob downwardly against the roll 18 of the lever 15, the spring also exerting a torsional strain to press the pencil against the tape. The knob 20, as previously stated, is rotatably and slidably adjustable on the post 22, whereby both the tension and torsional effect of the spring may be regulated. This adjustment may be effected in the construction illustrated in Fig. 8 by forming the binding post 108 with a milled head 109 and screwing the same thereby to a greater or less extent into the case.

Figure 1:
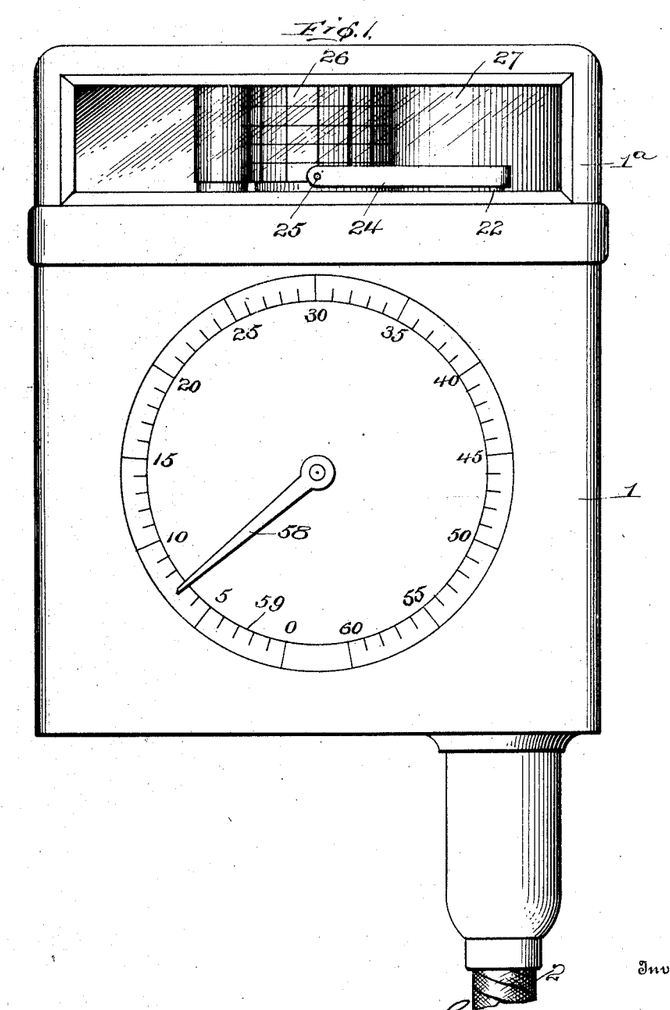
Figure 1 is a front elevation of the recorder in its case.
Figures 2, 9:
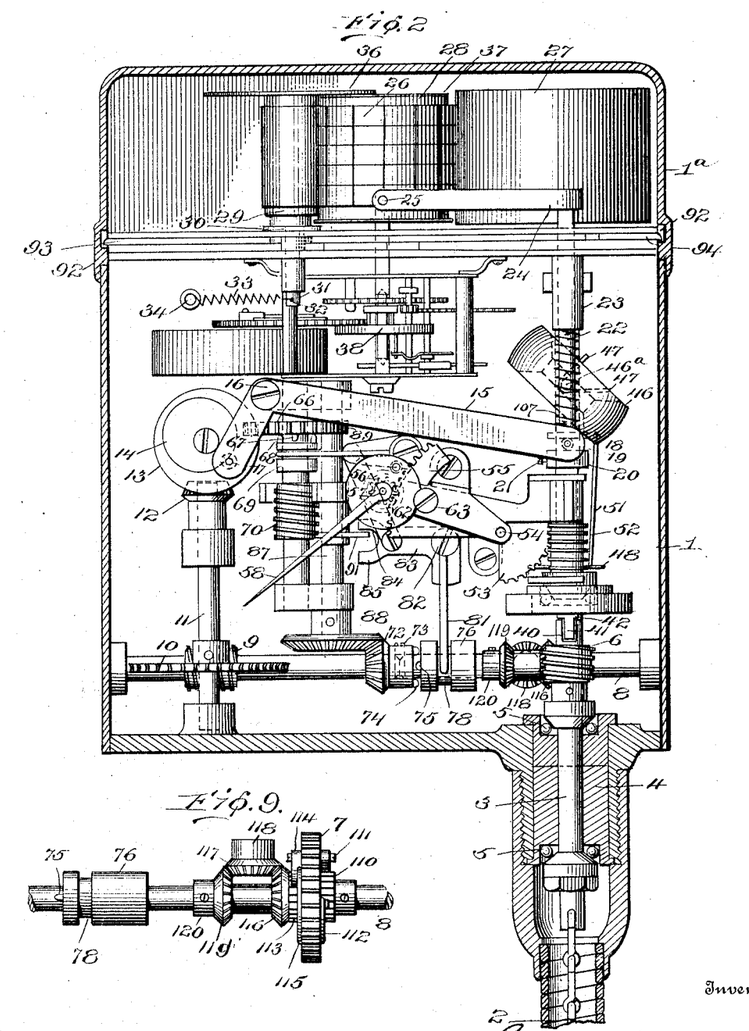
Fig. 2 is a vertical section through the case showing the registering and recording mechanism in front elevation.
Fig. 9 is a detail of the transmission shaft.

In order that the recording and the rewinding mechanism shall not be disarranged or the continuity of their action interfered with by an accidental reversal of the connection between the flexible shaft 2 and the vehicle wheel, or during a reverse movement of the vehicle, I provide means whereby the transmission shaft 8 is uniformly driven in one and the same direction, whatever be the direction of rotation of the shafts 2 and 3. For this purpose the worm wheel 7, engaging with the worm 6, is loosely mounted on the transmission shaft 8. Affixed to this shaft 8 at one side of the worm wheel 7 is a right hand ratchet 110 with which engages a pawl 111 carried by the worm wheel 7 and pressed by the spring 112 against the ratchet 110. On the opposite side of the worm wheel 7 is a left hand ratchet 113 loosely mounted on the shaft 8 and engaged by a pawl 114, under the influence of a spring 115, the pawl 114 being likewise carried by the worm wheel 7. The ratchet 113 is formed integral with or in fixed relation to a bevel gear 116 also loosely rotating on the shaft 8 and in mesh with an idler gear 117 carried by a stud shaft 118 and meshing in turn with a bevel gear 119 having its hub 120 secured to the shaft 8.

If the drive-shaft 3 be so connected with the vehicle as to be driven in the one direction its motion is transmitted by the worm 6, the worm wheel 7, and the ratchet 110 to the shaft 8 to drive the same in a forward direction, while, on the other hand, if the shaft 3 be so connected with the vehicle as to be driven in the opposite direction its movement will be transmitted by the worm 6, the worm wheel 7, and the ratchet 113 by way of the gears 116, 117 and 119 to the shaft 8 which will be driven in the same direction as before. In the one case the pawl 114 runs idly over the ratchet 113 and in the other case the pawl 111 runs idly over the ratchet 110. It will thus be seen that the transmission shaft 8 is always driven in the same direction regardless of the direction of rotation of the shafts 2 and 3.

Having thus fully described my invention, what I claim is:—

1. The combination, with clock mechanism to feed a record sheet forward at a uniform speed, of a recording pencil mounted to move transversely of the record sheet movement, a drive shaft, an eccentric driven by said shaft and arranged to rotate once for a given number of rotations of the drive shaft, a transmission member having one end adjustably connected with the pencil and the other end engaged by the eccentric, and yielding means to hold the pencil against the record sheet and the end of the transmission member in engagement with the eccentric to prevent any lost motion and to produce a continuous accurate record on the sheet.

2. The combination, with a feed-roll carrying a record tape, and clock mechanism to drive said feed-roll to feed the tape longitudinally a uniform distance in a given time, of a recording pencil mounted to move in a right line transversely to the tape movement, a drive-shaft, a cam driven by said shaft and arranged to rotate once for a given number of rotations of the drive shaft, a lever having one arm adjustably connected with the recording pencil and the other bearing upon the cam, and means to press the pencil against the tape and the lever against the cam.

3. The combination, with a feed-roll carrying a record tape, and clock mechanism arranged to drive the feed-roll to feed the tape longitudinally a uniform distance in one hour of time, of a recording pencil guided for movement in a right line transversely of the tape movement, a drive-shaft driven by the wheels of a vehicle, a cam driven by said shaft and arranged to rotate once for each mile traveled by the vehicle, and a lever pivoted with one arm connected to the recording pencil and the other bearing upon the cam, and means to press the pencil against the tape and the lever against the cam.

4. The combination, with a drive-shaft driven by the wheels of a vehicle, and a cam driven by said shaft and arranged to rotate once for each mile traveled by the vehicle, of a feed roll carrying a record tape divided longitudinally into uniform spaces, clock mechanism driving said feed roll to feed the tape longitudinally a given number of spaces in one hour of time, a pencil post mounted to slide at right angles to the tape movement, a pencil arm projecting from said post, and a pencil carried by said arm and resting against the face of the tape, and a lever pivoted with one arm bearing upon the pencil post and the other bearing upon the cam, and a combined compression and torsion spring arranged to press the pencil against the tape and the lever against the cam.

5. The combination, with a drive shaft driven by the wheels of a vehicle, and an eccentric driven by said shaft and arranged to rotate once for each unit of distance traveled by the vehicle, of a feed roll carrying a record tape divided longitudinally into uniform spaces, clock mechanism driving said feed roll to feed the tape longitudinally a given number of spaces in a unit of time, a pencil holder mounted to move at right angles to the tape movement, a pencil carried by said holder and resting against the face of the tape, and a lever pivoted with one arm bearing upon the eccentric and the other adjustably connected to the pencil holder.

6. The combination, with a drive-shaft driven by the wheels of a vehicle, and a cam driven by said shaft and arranged to rotate once for each mile traveled by the vehicle, of a feed roll carrying a record tape divided longitudinally into uniform spaces, clock mechanism driving said feed roll to feed the tape longitudinally a given number of spaces in one hour of time, a pencil post mounted to slide at right angles to the tape movement, a pencil arm projecting from said post, and a pencil carried by said arm and resting against the face of the tape, a knob adjustably mounted on the pencil post, and a lever pivoted with one end in engagement with the knob and the other bearing upon the cam.

7. The combination, with a drive-shaft driven by the wheels of a vehicle, and a cam driven by said shaft and arranged to rotate once for each mile traveled by the vehicle, of a feed roll carrying a record tape divided longitudinally into uniform spaces, clock mechanism driving said feed roll to feed the tape longitudinally a given number of spaces in one hour of time, a pencil post mounted to slide at right angles to the tape movement, a pencil arm projecting from said post, and a pencil carried by said arm and resting against the face of the tape, a knob carried by the pencil post and slidably and rotatably adjustable thereon, a coiled spring secured to said knob and to a fixed portion of the device and forcing the pencil against the tape and toward one extreme of its movement, and a lever pivoted with one end bearing upon the knob and the other upon the cam.

8. The combination, with a drive-shaft driven by the wheels of a vehicle, and a cam driven by said shaft and arranged to rotate once for each mile traveled by the vehicle, of a feed roll carrying a record tape divided longitudinally into uniform spaces, clock mechanism driving said feed roll to feed the tape longitudinally a given number of spaces in one hour of time, a pencil post mounted to slide at right angles to the tape movement, a pencil arm projecting from said post, and a pencil carried by said arm and resting against the face of the tape, a knob adjustably mounted on the pencil post and provided with a peripheral groove, and a lever carrying at each end an anti-friction roll, said lever pivoted with one of the rolls resting in the peripheral groove of the knob and the other bearing against the cam.

9. The combination, with a drive-shaft driven by the wheels of a vehicle, of a feed roll carrying a record tape divided longitudinally into equal spaces, clock mechanism to drive the feed roll to feed the tape, longitudinally a given number of spaces in one hour of time, a pencil post arranged to slide at right angles to the tape movement, a pencil arm carried by the post, a pencil carried by the arm, adjustable means to press the pencil against the tape and toward one extreme of its transverse movement, and means driven by the drive-shaft to reciprocate the pencil across the tape once for a given distance traveled by the vehicle.

10. The combination, with a drive-shaft driven by the wheels of a vehicle, of a feed roll carrying a record tape divided longitudinally into equal spaces, clock mechanism to drive the feed roll to feed the tape longitudinally a given number of spaces in one hour of time, a pencil post arranged to slide at right angles to the tape movement, a pencil arm carried by the post, a pencil carried by the arm, a knob slidably and rotatably adjustable on the post and provided with a peripheral groove, a coiled spring encircling the post and secured at one end to the knob and at the other to a fixed portion of the device, said spring forcing the pencil toward one extreme of its movement and exerting a torsional strain to press the same against the tape surface, a lever carrying at one end an anti-friction roll resting in the peripheral groove of the knob, and a connection between said lever and the drive-shaft to vibrate the lever once for a given distance traveled by the vehicle.

11. The combination, with a drive-shaft driven by the wheels of a vehicle, of a feed roll carrying a record tape divided longitudinally into equal spaces, clock mechanism to drive the feed roll to feed the tape longitudinally a given number of spaces in one hour of time, a pencil post arranged to slide at right angles to the tape movement, a pencil arm carried by the post, a pencil carried by the arm, a knob slidably and rotatably adjustable on the post and provided with a peripheral groove, a coiled spring encircling the post and secured at one end to the knob and at the other to a fixed portion of the device, said spring forcing the pencil toward one extreme of its movement and exerting a torsional strain to press the same against the tape surface, a lever carrying at each end an anti-friction roll and pivoted with one of said rolls resting in the peripheral groove of the knob, and a cam driven by the drive-shaft and arranged to rotate once for each mile traveled by the vehicle, said cam bearing upon the second anti-friction roll of the lever.

12. The combination, with a feed roll having metallic parts, of a take-up roll having metallic parts, and means to drive one of the rolls, one of said rolls being formed as a magnet whereby the driving of one roll is transmitted to the other.

13. The combination, with a feed roll having an iron end plate, of a take-up roll having an iron end plate in contact with that of the feed roll, and means to drive one of the rolls, one of the rolls being formed as a permanent magnet whereby the driving of one roll is transmitted to the other.

14. The combination, with a feed roll having a soft iron end plate, of a take-up roll having an iron end plate in contact with that of the feed roll and formed as a permanent magnet, and means to drive the feed roll.

15. The combination, with a tape feed roll having a friction surface, of a take-up roll provided with means to engage the tape end, means to yieldingly press the take-up roll against the tape on the feed roll, and means to drive the feed roll.

16. The combination, with a tape supply case, and a feed roll having a friction surface, of a take-up roll provided with means to engage the tape end, the tape passing from the case over the feed roll and under the take-up roll, means to yieldingly press the take-up roll against the tape on the feed roll, and means to drive the feed roll.

17. The combination, with a tape feed roll having a friction surface, of a take-up roll, means to yieldingly press the take-up roll against the tape on the feed roll, a pencil bearing on the tape, means to drive the feed roll longitudinally beneath the pencil a certain amount in a given time, and means to move the pencil transversely of the feed roll at varying speeds.

18. The combination, with a tape supply case, and a feed roll having a friction surface and a metallic end plate, of a take-up roll provided with means to engage the tape end and with a metallic end plate, means to yieldingly press the take-up roll against the tape on the feed roll, and means to drive the feed roll, the end plates of the two rolls overlapping each other and one of the rolls being formed as a permanent magnet whereby the driving of one is transmitted to the other.

19. The combination, with a tape supply case, and a feed roll having a friction surface and a soft iron end plate, of a take-up roll having an iron end plate overlapping that of the feed roll and formed as a permanent magnet, the take-up roll provided with means to engage the tape end, means to yieldingly press the take-up roll against the tape on the feed roll, and means to drive the feed roll.

20. The combination, with distance measuring mechanism, and time measuring mechanism arranged to coöperate to record the distance traveled in a given time, of means to automatically rewind the time mechanism, said rewinding means being actuated only when the time measuring mechanism is nearly run down.

21. The combination, with a vehicle, distance measuring mechanism driven thereby, and time measuring mechanism arranged to coöperate with the distance mechanism to produce a travel record, of means driven by the vehicle to rewind the time mechanism, said rewinding means being actuated only when the time measuring mechanism is nearly run down.

22. The combination, with a vehicle, distance measuring mechanism driven thereby, and time measuring mechanism arranged to coöperate with the distance mechanism to produce a travel record, of means to rewind the time mechanism, and means arranged to automatically couple the moving parts of the vehicle and the rewinding mechanism to rewind the latter when run down.

23. The combination, with a drive shaft, a speed recorder, and a clock, of normally inactive means to rewind the clock, and means to couple the rewinding means and the drive shaft as the clock approaches its unwound condition.

24. The combination, with a drive shaft, a visual speed indicator, a speed recorder, and a clock, of normally inactive clock-rewinding means, and means arranged to periodically couple the rewinding means and the drive shaft as the clock approaches its unwound condition.

25. The combination, with a drive shaft driven by a vehicle, a governor driven by said shaft, a visual speed index operatively connected with the governor, a pencil arranged in operative relation to a record sheet, and an operative connection between the pencil and the drive mechanism, of a clock mechanism, normally inactive clock-rewinding means, and means to couple the rewinding means to the driven means when the clock is nearly run down.

26. The combination, with a vehicle, a drive-shaft driven thereby, distance measuring mechanism driven by said shaft, and time measuring mechanism arranged to cooperate with the distance mechanism to produce a travel record, the time measuring mechanism including a clock movement, of means driven by the vehicle to rewind the clock movement, said rewinding mechanism comprising a spindle engaging the winding mandrel of the clock and rotating therewith, a gear mounted thereon, a pinion in engagement with the gear, a winding shaft carrying said pinion, a gear rotating loosely on the drive-shaft and forming a clutch member, a gear on the winding shaft in mesh with the clutch member, and means actuated automatically upon the running down of the clock movement to couple the clutch member with the drive-shaft.

27. The combination, with a vehicle, a drive-shaft driven thereby, distance measuring mechanism driven by said shaft, and time measuring mechanism arranged to cooperate with the distance mechanism to produce a travel record, the time measuring mechanism including a clock movement, of means driven by the vehicle to rewind the clock movement, said rewinding mechanism comprising a spindle engaging the winding mandrel of the clock and rotating therewith, a gear loosely mounted thereon and forming one member of a clutch, a sleeve forming a cooperating clutch member and splined to the spindle, a pinion meshing with the gear, a winding shaft carrying the pinion, a gear rotating loosely on the drive-shaft and forming one member of a second clutch, a sleeve splined to the drive-shaft and forming a cooperating member of the second clutch, a gear carried by the winding shaft and meshing with the gear of the second clutch, and means operated by the winding mandrel of the clock to couple and uncouple the clutches.

28. The combination, with a vehicle, a drive-shaft driven thereby, distance measuring mechanism driven by said shaft, and time measuring mechanism arranged to cooperate with the distance mechanism to produce a travel record, the time measuring mechanism including a clock movement, of means driven by the vehicle to rewind the clock movement, said rewinding mechanism comprising a spindle engaging the winding mandrel of the clock and rotating therewith, a gear loosely mounted thereon and forming one member of a clutch, a sleeve forming a cooperating clutch member and splined to the spindle, a pinion meshing with the gear, a winding shaft carrying the pinion, a gear rotating loosely on the drive-shaft and forming one member of a second clutch, a sleeve splined to the drive-shaft and forming a cooperating member of the second clutch, a gear carried by the winding shaft and meshing with the gear of the second clutch, a worm fixed on the winding spindle, a sleeve sliding on the winding shaft and carrying a rack in mesh with the worm, a lever pivoted with one arm in engagement with the sleeve of the second clutch and having its other end engaged by a projection of the rack sleeve at its two extremes of movement, whereby to couple and uncouple the clutch on the drive shaft, a second lever engaging the sleeve of the first clutch, and means connecting the two levers whereby the coupling of the members of the second clutch operates to couple the members of the first clutch.

29. The combination, with a vehicle, a drive-shaft driven thereby, distance measuring mechanism driven by said shaft, and time measuring mechanism arranged to cooperate with the distance mechanism to produce a travel record, the time measuring mechanism including a clock movement, of means driven by the vehicle to rewind the clock movement, said rewinding mechanism comprising a spindle engaging the winding mandrel of the clock and rotating therewith, a gear loosely mounted thereon and forming one member of a clutch, a sleeve forming a cooperating clutch member and splined to the spindle, a pinion meshing with the gear, a winding shaft carrying the pinion, a gear rotating loosely on the drive-shaft and forming one member of a second clutch, a sleeve splined to the drive-shaft and forming a cooperating member of the second clutch, a gear carried by the winding shaft and meshing with the gear of the second clutch, a worm fixed on the winding spindle, a sleeve sliding on the winding shaft and carrying a rack in mesh with the worm, a disk adjustable on the sleeve and projecting laterally therefrom, an angle lever pivoted with one arm engaging a recess formed in the sleeve of the second clutch and with its other arm bifurcated and extending with one prong on each side of the disk of the rack sleeve, a second lever arranged to engage a recess in the sleeve of the first clutch, and a link connecting the two levers whereby as the clock mandrel reaches the limit of its unwinding or winding movement the disk on the rack sleeve actuates the two levers to couple and uncouple the two clutches.

30. The combination, with a drive-shaft driven from the wheels of a vehicle, a governor-shaft driven thereby, a governor-ring pinned to the shaft and tending as the speed of the vehicle increases to assume a position at right angles to the shaft, a spring yieldingly holding the ring against the shaft at an inclination thereto, a disk mounted to slide parallel to the governor shaft, a link connecting the disk and one side of the ring, a sleeve formed as a rack mounted to slide on an axis parallel to the governor-shaft with one of its notches in engagement with the disk, an index hand, a pinion on the index arbor, and segmental gears meshing with the rack and with the pinion, of a cam driven by the drive-shaft and arranged to rotate once for a given distance traveled, a feed roll carrying a record tape, a clock movement to drive the feed roll to feed the tape longitudinally at a uniform speed, a recording pencil mounted to move transversely of the tape in a right line, means actuated by the cam to reciprocate the recording pencil at a rate varying with the speed of the vehicle, means to rewind the clock movement, and means to automatically couple the drive-shaft and the rewinding means when the clock movement is run down.

31. The combination, with a drive-shaft driven by the wheels of a vehicle, a governor-shaft driven thereby, a governor ring encircling the shaft and pinned thereto, said ring tending to assume a position at right angles to the shaft with increasing speed of its rotation, a spring bearing upon the shaft and upon the ring to yieldingly hold the same against the shaft at an acute angle thereto, a disk mounted to slide on the governor-shaft, a spring pressing the disk away from the governor ring, a link connecting the disk with one side of the ring, a transversely ribbed sleeve rack rotatably and slidably mounted on an axis parallel to the governor-shaft with one notch in engagement with the edge of the disk, an index hand, a pinion on the index arbor, connected segmental gears meshing one with the rack and the other with the pinion, an adjusting plate mounted concentrically of the index arbor, a spiral spring secured at one end to the arbor and pressing the index hand toward its zero position, the other end of the spring secured to the adjusting plate, and a set screw to hold the adjusting plate in its adjusted position, of a cam driven by the drive shaft and arranged to rotate once for each mile traveled, a supply case for a record tape divided longitudinally into uniform spaces, a feed roll having a friction surface and an iron end plate, a take-up roll formed as a permanent magnet and having an iron end plate overlapping the end plate of the feed roll, the tape passing from the supply case over the feed roll and under the take-up roll, means to yieldingly press the take-up roll against the tape on the feed roll, a pencil post mounted to move at right angles to the tape movement, a pencil arm carried thereby, a pencil mounted in the arm opposite the tape surface, an adjustable knob on the pencil post, a torsional and compression spring mounted upon the pencil post and secured at one end to the adjustable knob and at the other to a fixed portion of the device to yieldingly press the pencil against the tape and to hold the same at one extreme of its transverse movement, the adjustable knob formed with a peripheral groove, a lever provided at its two ends with anti-friction rolls, one resting in the groove in the knob and the other against the cam, whereby the pencil is reciprocated to and fro across the tape surface for each mile traveled by the vehicle, a clock movement having the arbor of its minute hand coupled to drive the feed roll to move the tape beneath the pencil a uniform number of spaces during each hour of time, and means to automatically rewind the clock movement when run down, said rewinding means comprising a spindle engaging the winding mandrel of the clock and rotating therewith, a gear loosely mounted thereon and forming one member of a clutch, a sleeve forming a coöperating clutch member and splined to the spindle, a pinion meshing with the gear, a winding shaft carrying the pinion, a gear rotating loosely on the drive-shaft and forming one member of a second clutch, a sleeve splined to the driveshaft and forming a coöperating member of the second clutch, a gear carried by the winding shaft and meshing with the gear of the second clutch, a worm fixed on the winding spindle, a sleeve sliding on the winding shaft and carrying a rack in mesh with the worm, a disk adjustable on the sleeve and projecting laterally therefrom, an angle lever pivoted with one arm engaging a recess formed in the sleeve of the second clutch and with its other arm bifurcated and extending one prong on each side of the disk of the rack sleeve, a second lever arranged to engage a recess in the sleeve of the first clutch, and a link connecting the two levers whereby as the clock mandrel reaches the limit of its unwinding or winding movement the disk on the rack sleeve actuates the two levers to couple and uncouple the two clutches.

32. The combination, with a drive-shaft connected with the drive wheels of a vehicle, a governor driven thereby, a speed index operatively connected with the governor, a pencil arranged in operative relation, of a record sheet, a two-arm lever arranged to operate said pencil, and a cam bearing upon one arm of the lever to actuate the same, of a transmission shaft geared to the drive-shaft and to the cam.

33. The combination, with a drive shaft connected with the drive wheels of a vehicle, a clock movement arranged to feed a record sheet a uniform distance in a given time, a pencil arranged in operative relation to the surface of the record sheet, and means to move said pencil over the sheet at a rate varying with the speed of the vehicle, of a transmission shaft geared to the drive shaft and to the pencil operating means, a rewinding mechanism connected to the winding mandrel of the clock movement, and means to automatically gear said winding mechanism with the transmission shaft as the clock movement runs down.

34. The combination, with a drive-shaft connected with the drive wheels of a vehicle, a governor driven thereby, a speed index operatively connected with the governor, a clock movement to feed a record tape longitudinally a uniform distance in a given time, a pencil arranged in operative relation to the tape surface, and means to move said pencil over the tape surface at a rate varying with the speed of the vehicle, of a transmission shaft geared to the drive-shaft and to the pencil-operating means, a rewinding mechanism connected to the winding mandrel of the clock movement, and means to automatically gear said winding mechanism with the transmission shaft as the clock movement runs down.

35. The combination, with a drive-shaft connected with the wheels of a vehicle, a governor driven thereby, a speed index, and an operative connection between the speed index and the governor, of a pencil arranged in operative relation to a record sheet, means to move said pencil over the sheet, a transmission shaft geared to the pencil operating means, a worm on the drive shaft, a worm wheel loosely mounted on the transmission shaft, right and left hand ratchet wheels, one secured to the transmission shaft at one side of the worm wheel and the other secured to a bevel gear loosely mounted on the transmission shaft on the opposite side of the worm wheel, right and left hand pawls carried by the worm wheel in operative relation to the two ratchets, a second beveled gear secured to the transmission shaft, and an idler gear connecting the two beveled gears whereby the transmission shaft is uniformly driven in the same direction irrespective of the direction of rotation of the drive-shaft.

36. The combination, with a drive-shaft connected with the drive wheels of a vehicle, a governor driven thereby, a speed index operatively connected with the governor, a clock movement to feed a record tape longitudinally a uniform distance in a given time, a pencil arranged in operative relation to the tape surface, and means to move said pencil over the tape surface at a rate varying with the speed of the vehicle, of a transmission shaft geared to the pencil operating means, a worm on the drive shaft, a worm wheel loosely mounted on the transmission shaft, right and left hand ratchet wheels, one secured to the transmission shaft at one side of the worm wheel and the other secured to a bevel gear loosely mounted on the transmission shaft on the opposite side of the worm wheel, right and left hand pawls carried by the worm wheel in operative relation to the two ratchets, a second bevel gear secured to the transmission shaft, and an idler gear connecting the two bevel gears whereby the transmission shaft is uniformly driven in the same direction irrespective of the direction of rotation of the drive-shaft, and a rewinding mechanism connected to the winding mandrel of the clock movement, and means to automatically gear said winding mechanism with the transmission shaft as the clock movement runs down.

In testimony whereof I hereunto affix my signature in the presence of two witnesses.

GEORGE S. MAXWELL.

Witnesses:
LEWIS T. GREIST,
EDWIN O. HILDEBRAND.